Sept. 12, 1967     E. A. CHILTON     3,341,716
LINEAR SAWTOOTH CURRENT GENERATOR FOR GENERATING A
TRAPEZOIDAL VOLTAGE WAVE FORM Filed Dec. 18, 1964     3 Sheets-Sheet 1

INVENTOR.
EDWARD A. CHILTON
BY
ATTORNEY

Sept. 12, 1967  E. A. CHILTON  3,341,716
LINEAR SAWTOOTH CURRENT GENERATOR FOR GENERATING A
TRAPEZOIDAL VOLTAGE WAVE FORM
Filed Dec. 18, 1964  3 Sheets-Sheet 2

INVENTOR.
EDWARD A. CHILTON
BY
ATTORNEY

INVENTOR.
EDWARD A. CHILTON
BY Herbert L. Davis
ATTORNEY

United States Patent Office 3,341,716
Patented Sept. 12, 1967

3,341,716
LINEAR SAWTOOTH CURRENT GENERATOR FOR GENERATING A TRAPEZOIDAL VOLTAGE WAVE FORM
Edward A. Chilton, Westwood, N.J., assignor to The Bendix Corporation, Teterboro, N.J., a corporation of Delaware
Filed Dec. 18, 1964, Ser. No. 419,528
16 Claims. (Cl. 307—88.5)

The present invention relates to an improved linear sawtooth current generator for generating a trapezoidal voltage wave form and, more particularly, to a novel means for producing a sawtooth voltage wave form having a voltage "jump" that may be applicable to an X and Y type axis oscillator for a magnetic deflection yoke having resistance and inductance. Such oscillators may be of a type utilized with a star position determination circuit such as disclosed and claimed in a copending U.S. application Ser. No. 385,902, filed July 29, 1964, by Edward A. Chilton and George V. Zito, and applied to an image disector photo multiplier tube such as described and claimed in a copending U.S. application Ser. No. 385,878, filed July 29, 1964, by William R. Polye, both of which applications have been assigned to The Bendix Corporation, assignee of the present invention.

It is an object of the invention to provide a novel means for producing a linearly rising sawtooth current as a function of time in the energizing circuit for such a magnetic deflection yoke comprised of a resistor and inductor and to an improved means for effecting a linear deflection of the yoke magnetic field in which the following conditions apply:

$i = kt$
$di/dt = k$ but $E = iR + L\, di/dt$
$E = kRt + Lk$ and in which an object of the invention is to drive the yoke with the voltage $E = kRt + Lk$ where $Lk$ is a magnitude of a desired voltage "jump."

Another object of the invention is to provide a novel means to produce a sawtooth current in such a yoke circuit to drive the magnetic deflection yoke with the voltage $E = kRt + Lk$ where $Lk$ is a magnitude of a desired voltage jump to effect a desired trapezoidal voltage wave form.

Another object of the invention is to provide an improved linear sawtooth current generator embodying a novel means for injecting a jump pulse at the start of a capacitor charging cycle to generate the desired trapezoidal voltage wave form at the input of an inductive load.

Another object of the invention is to provide in such a sawtooth current generator novel periodically operable means to discharge a controlling capacitor means down to a predetermined voltage level determined by the conductivity characteristics of such means and, beyond which level, the capacitor means will discharge no further.

Another object of the invention is to provide, in cooperative relation with such capacitor discharge means, an output control transformer, together with means for momentarily injecting therein a pulse in timed relation with initiation of the capacitor discharge means and with the start of the charging cycle of the capacitor to effect an output voltage sawtooth wave shape with jump to provide a desired characteristic for energization of an inductive load.

Another object of the invention is to provide a novel control circuit to periodically discharge an output control capacitor means through a zener diode at a reverse breakdown voltage in excess of a predetermined value while simultaneously injecting a pulse into a control transformer to turn off the output voltage to an inductive load so as to effect, upon a simultaneous cessation of the injected voltage and resumption of a charging cycle of the control capacitor means, a desired output voltage sawtooth wave shape with jump for energizing the inductive load at the peak of the wave with a maximum voltage almost equal to that of the voltage at the main supply source.

Another object of the invention is to provide in the aforenoted control circuit a novel pulse generating means operatively connected so as to simultaneously effect from a single source of electrical energy an electrical pulse for effectuating a periodic discharge of the capacitor means and a cessation of the output voltage.

Another object of the invention is to provide a novel variable capacitive means to set the effective duration of the generated electrical pulse.

Another object of the invention is to provide in the aforenoted control circuit novel operator-operative means to vary the frequency of the generated electrical pulse.

Another object of the invention is to provide in the aforenoted control circuit novel operator-operative means to vary the duration of the generated electrical pulse.

Another object of the invention is to provide novel operator-operative means to vary the maximum peak voltage of the sawtooth output voltage wave.

Another object of the invention is to provide novel operator-operative means to vary an interval of time between successive output voltage waves.

These and other objects and features of the invention are pointed out in the following description in terms of the embodiment thereof which is shown in the accompanying drawings. It is to be understood, however, that the drawings are for the purpose of illustration only and are not a definition of the limits of the invention. Reference is to be had to the appended claims for this purpose.

In the drawings in which corresponding parts have been indicated by like numerals:

Figure 1:
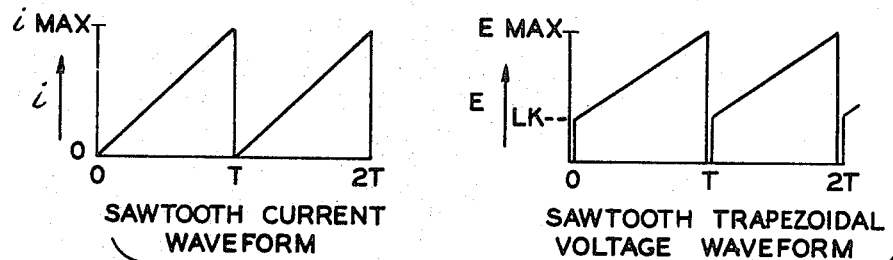
FIGURE 1 is a graphical illustration showing a desired sawtooth current wave form and a desired sawtooth trapezoidal voltage wave form applied by the present invention across an inductive load including resistance.
Figure 2:
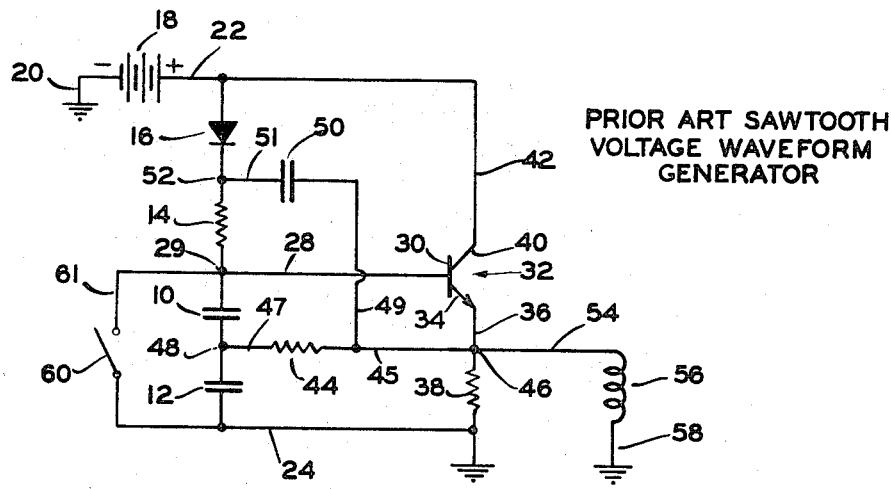
FIGURE 2 is a wiring diagram of a prior art type sawtooth voltage wave form generator.
Figure 4:
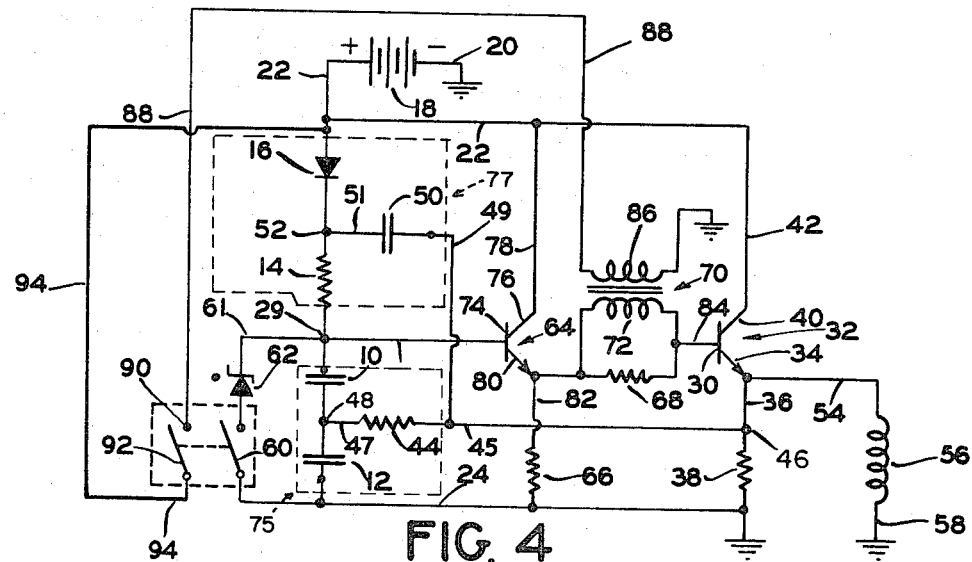

FIGURE 4 is a wiring diagram illustrating improvements in the sawtooth current generator of the present invention over that of the prior art generator of FIGURE 2 in the provision of a novel zener diode to limit the discharge level of the controlling capacitors and the provision of a novel pulse-injecting transformer effective during the interval that the output control capacitors are discharging to effect a sharp cut-off of the output voltage to the load so that, upon a resumption of the charging cycle of the capacitors and simultaneous cessation of operation of the pulse-injecting transformer, there is effected the desired output voltage sawtooth trapezoidal wave shape with jump, shown graphically in FIGURE 1.

Figure 5:
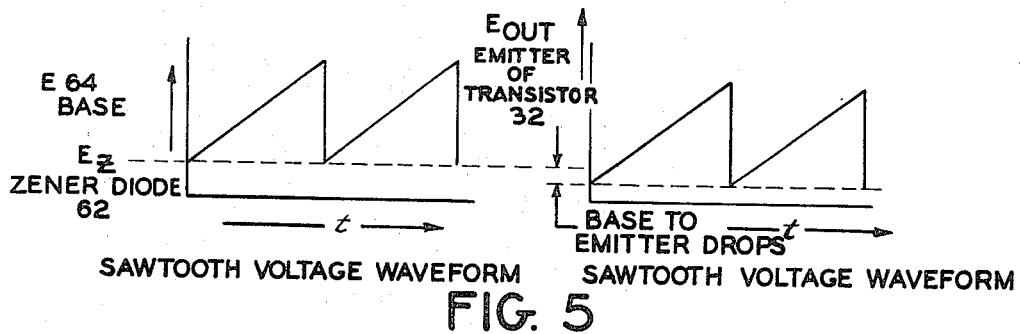

FIGURE 5 is a graphical illustration showing a sawtooth voltage wave form at the base of the transistor 64 and an output sawtooth voltage wave form at the emitter of the transistor 32 effected through the operation of the zener diode of FIGURE 4 in which, upon closing switch 60, the capacitor will discharge down to the reverse breakdown zener voltage level ($E_z$) at the base of the transistor 64, and the output at the emitter of the transistor 32 will decrease to the zener voltage level ($E_z$) less the transistor base-emitter voltage drops in the absence of the operation of the pulse-injector transformer.

Figure 6:
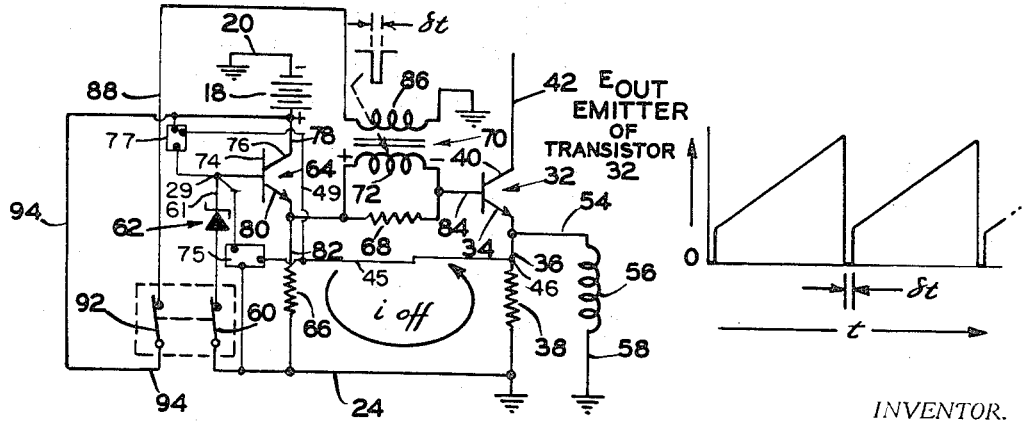

FIGURE 6 is a wiring diagram illustrating the operation of the pulse-injector transformer in that, during the interval that the capacitor discharging circuit is closed by switch 60, an electrical pulse is injected into the transformer of a polarity such as to turn an output control transistor off so that, upon the discharging circuit for the capacitor being discontinued so as to render a charging circuit for the capacitor effective, as shown by FIGURE 4, and the electrical pulse being simultaneously terminated, a desired voltage sawtooth trapezoidal output wave shape with jump will be applied through the output control transistor and across the load, as indicated graphically at one side of the electrical circuit of FIGURE 6.

Figure 7:
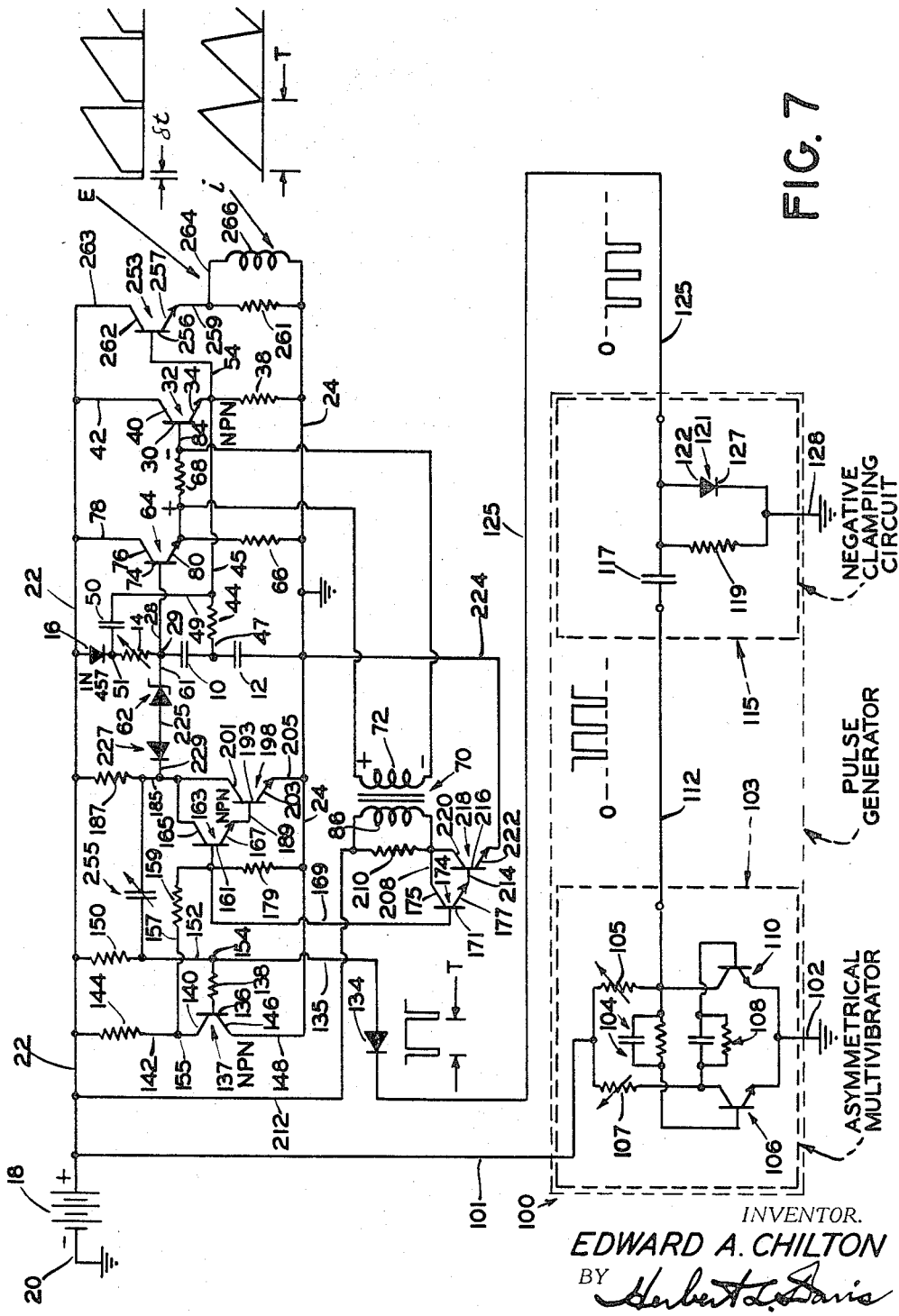

FIGURE 7 is a wiring diagram illustrating a modified form of the improved linear sawtooth current generator embodying the present invention.

Figure 3:
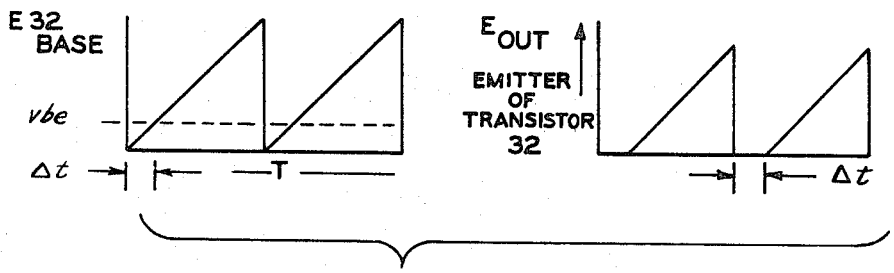
FIGURE 3 is a graphical illustration of the sawtooth voltage wave form at the base of transistor 32 and the sawtooth voltage wave form at the emitter of transistor 32 effected by the prior art generator of FIGURE 2 and illustrating shortcomings of such a generator in failing to produce a voltage output until there had been effected a time delay indicated by the symbol $\Delta t$.

Referring to the drawing of FIGURE 2, there is shown a circuit diagram of a prior art type linear sawtooth current generator for producing a periodic sawtooth voltage wave form, as shown graphically in FIGURE 3. The operation of this type of circuit is well described in prior literature and a detailed description thereof is not deemed necessary at this time, but, for a further understanding of the operation, reference may be made to the chapter on "Current Time-Base Generators" at pages 236–252 of "Pulse and Digital Circuits" by Millman and Taub, published by McGraw-Hill, New York, New York (1956).

It will be seen then that, in the prior art type circuit of FIGURE 2, capacitors 10 and 12 may be charged through a resistor 14 and diode 16 from a suitable source of direct current 18 having a negative terminal connected to ground through a conductor 20 and a positive terminal connected by a conductor 22 to the serially connected diode 16, resistor 14, capacitor 10 and capacitor 12. The capacitor 12 is, in turn, connected through a conductor 24 to ground, thereby returning to the grounded negative terminal of the battery 18. The charging voltage applied across the capacitors 10 and 12 is thus applied through a conductor 28 leading from a point 29 intermediate the capacitor 10 and resistor 14 to a base element 30 of an NPN type transistor 32 which has an emitter element 34 connected through a conductor 36 and resistor 38 to the grounded conductor 24. A collector element 40 of the transistor 32 is connected through a conductor 42 to the line 22 leading to the positive terminal of the source of direct current 18.

Further, the arrangement is such that the output voltage at the line 36 from the emitter element 34 of the transistor 32 is fed back through a resistor 44 connected at one end by a conductor 45 to a point 46 on the conductor 36 and at an opposite end by a conductor 47 to a point 48 intermediate the respective capacitors 10 and 12. A conductor 49 leads from the conductor 45 to one plate of a capacitor 50, while the opposite plate of the capacitor 50 is connected by a conductor 51 to a point 52 intermediate the resistor 14 and diode 16 so as to provide, in effect, a so-called "boot strapping" effect, resulting in a constant current charging of the capacitors 10 and 12.

This constant charging of the capacitors 10 and 12 results in a linearly rising voltage at the base 30 of the transistor 32, causing, in turn, a linearly rising voltage at an output conductor 54 leading from the point 46 on the conductor 36 to one terminal of the magnetic load winding 56 having an opposite terminal connected through a conductor 58 to ground so as to connect the same to the grounded conductor 24 and thereby across the resistor 38 in the emitter circuit of the transistor 32.

In the aforenoted arrangement of FIGURE 2, the base element 30 of the transistor 32 is periodically shorted to ground by a switch element 60 connected to the grounded conductor 24 closing a contact connected through a conductor 28 and point 29 intermediate the charging resistor 14 and capacitor 10. The closing of the switch element 60, in turn, permits the charged capacitors 10 and 12 to discharge through the closed switch element 60 to the grounded conductor 24. Upon an opening of the closed switch 60, the capacitors 10 and 12 will start to charge from the battery 18 through the charging resistor 14 and will continue charging until the switch 60 is periodically closed so as to short the capacitors once again to ground. The resistor 14 provides a time delay in the charging cycle of the capacitors 10 and 12.

In such a prior art arrangement, it has been found that the circuit, as shown in FIGURE 2, has certain shortcomings in failing to produce an output at the emitter 34 of the transistor 32 until the capacitors 10 and 12 have been charged up to a voltage equal to that of the voltage drop across the base 30 and the emitter 34 of the transistor 32, as shown graphically in FIGURE 3. Thus, in the prior art sawtooth current generator, there is effected an undesirable time delay, indicated graphically in FIGURE 3 by the symbol $\Delta t$, before there is an output voltage across the output line 54 and the grounded connection 24 of the current generator of FIGURE 2.

*Improved linear sawtooth current generator*

In the improved linear sawtooth current generator of FIGURE 4 and in which there are embodied features of the present invention, there is provided in series with the switch 60 a zener diode 62. The zener diode 62 is of a type having a unique reverse breakdown characteristic which permits conduction of current in the reverse direction from the capacitor 10 through the switch element 60 to the grounded conductor 24 upon the voltage applied thereto exceeding certain critical values. The arrangement is such that, upon the closing of the switch 60, the capacitors 10 and 12 will effect a reverse discharge flow of current through the zener diode 62 and switch 60 down to the breakdown voltage level of the zener diode 62 and, beyond which, the capacitors 10 and 12 will discharge no further. The zener diode 62 is so selected as to have a voltage breakdown level which is greater than the sum of the voltage drop between the transistor base 30 to the emitter 34 and the voltage drop between the transistor base 74 and the emitter 80 so that the capacitors 10 and 12 will not fully discharge and, upon the switch 60 being reopened, the output applied to the conductor 54 will have a linearly increasing voltage, as shown graphically in FIGURE 5.

However, in the improved linear sawtooth current generator of FIGURE 4, there is provided an additional transistor stage comprising an NPN type transistor 64, resistor 66, resistor 68 and a pulse injector transformer 70 having a secondary winding 72 placed between the charging circuit and the base element 30 of the transistor 32.

In the aforenoted arrangement, the transistor 64 has a base element 74 connected by the conductor 28 to a point 29 intermediate the capacitor 10 of a capacitive network in a box 75, as shown diagrammatically by FIGURE 6 and in detail by FIGURE 4, and the resistor 14 in a charging network of a box 77, as shown diagrammatically by FIGURE 6 and in detail by FIGURE 4. The transistor 64 further has a collector element 76 connected by a conductor 78 to the line 22 leading from the positive terminal of the source of direct current 18. An emitter element 80 of the transistor 64 is connected by a conductor 82 and resistor 66 to the grounded conductor 24. Further, there are connected to the conductor 82 one end of the resistor 68 and the secondary winding 72 of the pulse injector transformer 70, while an opposite end of the resistor 68 and the secondary winding 72 is connected by a conductor 84 to the base 30 of the transistor 32.

The pulse injector transformer 70 has a primary winding 86 having one terminal connected to ground and an opposite terminal connected through a conductor 88 to a contact 90 of a control switch 92 connected through a conductor 94 to the positive terminal of the battery or source of direct current 22, the opposite negative terminal of the battery 22 being connected to ground through the conductor 20. The switch 92 is arranged to momentarily close the contact 90 so as to apply an electrical pulse to the primary winding 86 of the transformer 70 which, in turn, induces into the secondary winding 72 an electrical pulse acting in a negative sense on the base 30 of the transistor 32 so as to turn off or momentarily render the NPN type transistor 32 completely nonconductive, as indicated graphically to the right of FIGURE 6.

The switches 60 and 92, as shown in the circuit of FIGURE 6, are arranged to be simultaneously momentarily closed so that the closing of the discharge circuit for the capacitor means 10 and 12 is effected simultaneously with the closing of the switch 92 effecting the injection of the electrical pulse in the primary winding 86 so as to induce in the secondary winding 72 of the pulse injection transformer 70 an electrical pulse of a polarity acting in a sense to turn off the transistor 32 or render the same nonconductive.

It will be seen then that, during the time interval that the switch 60 is closed to discharge the capacitor means 10 and 12, a pulse is injected into the transformer 70 that will turn the transistor 32 off so that the output voltage controlled thereby will drop to zero and below the breakdown voltage level of the zener diode 62, as shown graphically to the side of FIGURE 6 as compared to the sawtooth voltage wave form of FIGURE 5.

Thus, upon the switch 60 closing the discharge circuit for the capacitors 10 and 12 through the zener diode 62, the capacitors 10 and 12 will be sharply discharged from the peak sawtooth voltage down to the reverse breakdown voltage level provided by the zener diode 62, while the pulse simultaneously induced into the secondary winding of the pulse injected transformer 70 will be applied in a negative sense to the base 30 of the NPN type transistor 32 so as to further reduce the voltage applied through the transistor 32 to a zero value, as indicated in the graph to the side of FIGURE 6.

Moreover, upon the switch 60 opening after the momentary closure thereof so as to render effective the charging circuit for the capacitors 10 and 12 and the switch 92 simultaneously opening to terminate the electrical pulse injected into the pulse injector transformer 70, the induced negative pulse thus applied by the secondary winding 72 to the base 30 of the transistor 32 will be removed and the positive charge applied by the capacitor means 10 and 12 through the transistor 64 and resistor 68 and transformer secondary winding 72 to the base 30 will be resumed. This will then result in a sharp jump output voltage being applied through the output control transistor 32 and across the lines 54 and 24 to the electromagnetic load winding 56, controlled thereby, as shown in the graph to the right of the circuit of FIGURE 6. Thereafter, as the charging cycle of the capacitor means 10 and 12 is resumed, there will result the sawtooth linearly rising current and voltage wave forms, shown graphically in FIGURE 1 and to the right of FIGURE 6.

While the capacitor discharge circuit and the pulse injector circuit are shown in FIGURE 6 diagrammatically as including switch elements 60 and 92 which are so arranged as to simultaneously close and open the respective circuits, it should be understood that such circuits may also be controlled by suitable electronic means including transistors, electronic valves or other electronic switching units of types well known in the art. A modified form of control circuit embodying the invention and which may effect the aforedescribed operation is shown diagramamtically in FIGURE 7.

Modified form of the invention

In the form of the invention illustrated in FIGURE 7, corresponding parts to those heretofore described with reference to FIGURE 6 have been indicated by like numerals. Moreover, in the control circuit of FIGURE 7, there is provided a pulse generator 100 which may be of conventional type operatively connected across the source of direct current 18 through conductor 101 leading from the positive terminal and a ground conductor 102 leading to the negative terminal of the source 18. The pulse generator may include an asymmetrical multivibrator 103 which may be of a conventional type including transistors 106 and 110. The transistor 106 includes a base control circuit 104 having an adjustable resistor 105 and the transistor 110 includes a base control circuit 108 having an adjustable resistor 107. The base control circuits 104 and 108 are so set by the adjustment of the resistors 105 and 107 that the time constant of one of the base control circuits is made long with respect to the time constant of the other base control circuit so that one of the transistors 106 or 110 remains cut off for only a small fraction of the cycle of operation so as to cause the asymmetrical multivibrator 103 to apply at an output line 112 electrical pulses of short duration with relatively long periods of time between pulses in an asymmetrical wave form, shown graphically above the output line 112 of FIGURE 7.

This output at line 112 is, in turn, applied through a conventional negative clamping circuit 115 including a capacitor 117 in the line 112 and a resistor 119 across which is connected a diode 121 having an anode element 122 connected to an output line 125 and a cathode element 127 connected to ground by a conductor 128 so as to cause the positive going electrical pulses from the capacitor 117 in line 112 to be shunted through the diode 121 to ground, while the negative going pulses are applied at the output line 125 in an asymmetrical wave form which varies between some negative value and a zero reference voltage.

The arrangement of the pulse generator 100 is such as to periodically apply negative pulses in an asymmetrical wave form, as shown graphically above the output line 125 of FIGURE 7, to the conductor 125 leading to a cathode element of a diode 134 having an anode element thereof connected by a conductor 135 to a base element 136 of an NPN type transistor 137 through a resistor 138 to render the normally conductive transistor 137 nonconductive between a collector element 140 and an emitter element 146 for the duration of the effect of each negative going electrical pulse and the "one-shot" action of transistors 137 and 163.

The transistor 137 has the collector element 140 connected through a conductor 142 and a resistor 144 to the conductor 22 leading from the positive terminal of the source of electrical energy or battery 18, while the emitter element 146 of the transistor 137 is connected through a conductor 148 to the grounded conductor 24. Further, leading from the conductor 22 is a resistor 150 connected by a conductor 152 to the conductor 135 at a point 154 and thereby through the resistor 138 to the base element 136 of the transistor 137. Thus, in the absence of a negative going pulse being applied through the conductor 125 to the base 136 of the transistor 137, it will be seen that a high potential will be applied through the resistor 150 to the base 136 of the transistor 137 so as to normally render the transistor 137 conductive from the collector 140 to the emitter 146, in which event, point 155 on the collector conductor 142 of the transistor 137 will be at a low potential.

The point 155 is connected through a conductor 157 and resistor 159 to a base element 161 of an NPN type transistor 163. This low potential will be then applied to the base 161 so as to normally maintain the transistor 163 nonconductive between the collector element 165 and emitter element 167 thereof. Also leading from the base element 161 of the transistor 163 is a conductor 169 which leads to a base element 171 of an NPN type transistor 174. The conductor 169, in turn, applies such low potential to the base element 171 of the transistor 174 so as to normally maintain the transistor 174 also nonconductive between the collector element 175 and emitter element 177 thereof so long as the transistor 163 is maintained nonconductive by the low potential applied to the base 161 thereof. A resistor element 179 connects the base element 161 of the transistor 163 and the base element 171 of the transistor 174 to the low potential ground conductor 24.

The arrangement is such then that so long as the transistor 137 is maintained in the aforenoted conductive state, the transistors 163 and 174 are maintained in a nonconductive state. However, upon the transistor 137 being rendered nonconductive by the application of a negative pulse from the pulse generator 100 to the base 136 thereof, a high potential is applied at the point 155 through the resistor 144 and, in turn, applied through the conductor 157, resistor 159 and conductor 169 to the bases 161 and 171 of the aforenoted transistors 163 and 174, which high potential, in turn, renders the transistors 163 and 174 conductive for purposes which will be explained hereinafter.

As shown in FIGURE 7, the collector element 165 of transistor 163 is connected by a conductor 185 and resistor 187 to the conductor 22 leading from the positive terminal of the source of direct current or battery 18, while the emitter element 167 of the transistor 163 is connected through a conductor 189 to a base 193 of an NPN type transistor 198 having a collector element 201 connected to the conductor 185 and an emitter element 203 connected through a conductor 205 to the grounded conductor 24.

Similarly, the transistor 174 has a collector element 175 thereof connected by a conductor 208 to one end of a resistor 210, while the opposite end of the resistor 210 is connected through a conductor 212 to the conductor 22 leading from the positive terminal of the source of direct current or battery 18. The transistor 174 has an emitter element 177 connected through a conductor 214 to a base element 216 of an NPN type transistor 218. The transistor 218 has a collector element 220 connected to the conductor 208 and an emitter element 222 connected through a conductor 224 to the grounded conductor 24.

From such arrangement of the transistors 163 and 198 and the transistors 174 and 218, it will be seen that so long as the transistor 163 is maintained nonconductive, the transistor 198 will also be maintained nonconductive and so long as the transistor 174 is maintained nonconductive, the transistor 218 will also be maintained nonconductive. However, upon the transistor 163 being rendered conductive by the controlling transistor 137 being turned off, the transistor 198 will also be rendered conductive. Similarly, the action of the negative pulse applied by the pulse generator 100 in rendering the transistor 137 nonconductive will also render the transistor 174 conductive and the transistor 218 similarly conductive.

As shown in FIGURE 7, the anode element of the zener diode 62 is connected by a conductor 225 to the anode element of a diode 227, while the cathode element of the diode 227 is connected by a conductor 229 to the conductor 185 so that so long as the transistors 163 and 198 are rendered nonconductive, a high potential will be applied to the line 185 and to the cathode element of the diode 227 sufficient to back bias the diode 227 so as to prevent a discharge of the capacitors 10 and 12 through the zener diode 62 and diode 227.

However, upon the transistors 163 and 198 being rendered conductive by the application of a negative pulse by the pulse generator 100 to the base 136 of the controlling transistor 137, the potential applied at the line 185 leading to the collector elements of the transistors 163 and 198 will thereupon decrease to a low potential sufficient to permit a reverse current discharge of the capacitors 10 and 12 through the zener diode 62 and diode 227 and thereby through the transistors 163 and 198 to the grounded conductor 24. This discharge of the capacitors 10 and 12 will, of course, be limited by the reverse current breakdown voltage level of the zener diode 62, as heretofore explained with reference to FIGURES 4 and 6.

Simultaneously with the effectuation of the discharge circuit for the capacitors 10 and 12 through the diode 227 and transistors 163 and 198, the application of the negative pulse to the base 136 of the controlling transistor 137 by the pulse generator 100 will also cause the transistors 174 and 218 to be rendered conductive, whereupon a flow of current will result from the positive terminal of the battery 18 through the conductor 212, resistor 210, transformer 70 primary 86, transistors 174 and 218, and conductor 224 to the grounded conductor 24 and thereby return to the negative terminal of the battery 18. As shown in FIGURE 7, there is connected across the resistor 210 the primary winding 86 of the pulse injector transformer 70 which, in response to the voltage drop caused by the flow of the current through the resistor 210, transformer 70 and primary 86, will induce an electrical pulse into the secondary winding 72 which will, in turn, be applied across the resistor 68 and act in a negative going sense in relation to the base element 30 of the transistor 32 so as to render the transistor 32 nonconductive simultaneously with the discharge of the capacitors 10 and 12, as heretofore explained with reference to the circuits of FIGURES 4 and 6.

Similarly, upon the effect of the negative going pulse on the base element 136 of the transistor 137 being dissipated, the controlling transistor 137 resumes its normal conductive state, whereupon the controlled transistors 163 and 198 and the controlled transistors 174 and 218 are simultaneously rendered nonconductive so as to, in turn, effectuate the charging circuit for the capacitors 10 and 12 and withdraw the negative going pulse applied to the base element 30 of the transistor 32 to render the transistor 32 conductive to effect the desired voltage output across the lines 54 and 24.

In the network of FIGURE 7, the capacitor 255 causes a delay in the action of the controlling transistor 137. This is the so-called "one shot" action by transistors 137, 163 and 198, effected by capacitor 255.

The output of the transistor 32 applied then across the lines 54 and 24 serves to control the operation of a power amplifier transistor 253.

The transistor 253, which may be of NPN type, includes a base element 256 connected to the output conductor 54, an emitter element 257 connected by a conductor 259 through a resistor 261 to the grounded conductor 24, and a collector element 262 connected by a conductor 263 to the conductor 22 leading from the positive terminal of the battery or source of electrical energy 18. An output conductor 264 leads from the emitter conductor 259 to one terminal of a load coil 266, while the opposite terminal of the load coil 266 is connected to the grounded conductor 24. The described network serves then to control through the power amplifier transistor 253 the energization of the load coil 266 so as to effect the desired voltage output across the lines 264 and 24 to the load coil 266 having a trapezoidal sawtooth wave shape with jump, as heretofore explained in reference to FIGURES 4 and 6 and shown graphically in FIGURE 7 at the right of the wiring diagram.

It will be further seen that, in the wiring diagram of the network of FIGURE 7, there is connected between the conductor 152 and the conductor 185 the variable capacitor 255 which may be adjusted by the operator so as to set the effective duration of the off-time of transistor 137 by the one-shot action and thereby determines the width $\delta t$ of the time interval that the injected pulse is present during the voltage wave form shown at the right of FIGURE 7.

The maximum amplitude of the voltage at the peaks of these sawtooth voltage waves may be also set by the operator adjusting the variable charging resistor 14, while the frequency of the sawteeth voltage wave forms may, of course, be varied by suitable operator adjustment of the variable resistors 105 and 107 of the asymmetrical multivibrator of the pulse generator 100.

A typical system embodying the invention, as shown in FIGURE 7, may include the described elements of the following values and types:

| | |
|---|---:|
| Resistors 144 and 187 ohms | 27,000 |
| Resistor 150 do | 100,000 |
| Resistor 14 do | 2.4 |
| Resistors 159 and 179 do | 47,000 |
| Resistor 66 do | 91,000 |
| Resistor 38 do | 12,000 |
| Resistor 261 do | 1,200 |
| Resistor 210 do | 15,000 |
| Resistor 68 do | 2,000 |

Coil 266, resistance 68 ohms, inductance 10 millihenries

| | |
|---|---:|
| Capacitors 12 and 50 microfarad | .01 |
| Capacitor 10 do | .001 |
| Diodes 16 and 227 | Type 1N457 |
| Zener diode 62 | Type 1N752 |
| Diode 134 | Type 1N100 |
| NPN transistors 32, 64, 137, 163 and 174 | Type 2N760A |
| NPN transistors 198 and 218 | Type 2N706A |
| NPN transistor 253 | Type 2N657 |

While several embodiments of the invention have been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. In a means for producing an output voltage having a sawtooth wave form of a type including a source of voltage, means for controlling the voltage applied from said source to an output inductive load, capacitor means for operating said control means, first means selectively operable to progressively charge said capacitor means from said source so as to render said control means effective to apply a linearly increasing voltage from said source to said load, and second means alternately operable to effect a periodic discharge of said capacitor means so as to cause said control means to effect a sharp decrease in the voltage applied from said source to said load upon the periodic discharge of said capacitor means; the improvement in which said discharge means includes means having a threshold potential below which it is non-conductive and above which it is conductive so as to limit the discharge of the capacitor means effected by said second means to a predetermined minimum voltage charge and thereby the voltage applied by said control means from the source to the load to a predetermined minimum value, and said minimum voltage charge of said capacitor means being such as to be effective to cause the control means to apply a minimum voltage from said source to said load at a start of the selective operation of said first charging means.

2. In a means for producing an output voltage having a sawtooth wave form of a type including a source of voltage, means for controlling the voltage applied from said source to an output inductive load, capacitor means for operating said control means, first means selectively operable to progressively charge said capacitor means from said source so as to render said control means effective to apply a linearly increasing voltage from said source to said load, and second means alternately operable to effect a periodic discharge of said capacitor means so as to cause said control means to effect a sharp decrease in the voltage applied from said source to said load upon the periodic discharge of said capacitor means; the improvement in which said discharge means includes means to limit the discharge of the capacitor means effected by said second means to a predetermined minimum voltage charge and thereby the voltage applied by said control means from the source to the load to a predetermined minimum value, said minimum voltage charge of said capacitor means being such as to be effective to cause the control means to apply a minimum voltage from said source to said load at a start of the selective operation of said first charging means, and other means effective during the discharge of the capacitor means to cause the control means to decrease the voltage applied by said control means from said source to said load to a value below the predetermined minimum value effected by the minimum voltage charge of the capacitor means.

3. In a means for producing an output voltage having a sawtooth wave form of a type including a source of voltage, means for controlling the voltage applied from said source to an output inductive load, capacitor means for operating said control means, first means selectively operable to progressively charge said capacitor means from said source so as to render said control means effective to apply a linearly increasing voltage from said source to said load, and second means alternately operable to effect a periodic discharge of said capacitor means so as to cause said control means to effect a sharp decrease in the voltage applied from said source to said load upon the periodic discharge of said capacitor means; the improvement in which said discharge means includes means to limit the discharge of the capacitor means effected by said second means to a predetermined minimum voltage charge and thereby the voltage applied by said control means from the source to the load to a predetermined minimum value, said minimum voltage charge of said capacitor means being such as to be effective to cause the control means to apply a minimum voltage from said source to said load at a start of the selective operation of said first charging means, and electrical pulse injector means to render the control means effective to completely cut off the voltage applied from said source to said load and below the minimum value effected by the minimum voltage charge of said capacitor means.

4. The combination defined by claim 3 in which the improvement includes means to render said pulse injector means simultaneously effective with the second means for discharging said capacitor means and ineffective with the start of the selective operation of the first charging means.

5. The combination defined by claim 1 in which the improvement includes an electrical pulse generator, means for energizing said pulse generator from the voltage source, means for operatively connecting said pulse generator to the second means for controlling the discharge of said capacitor means, and said second means being periodically operated to effect the discharge of said capacitor means by electrical pulses from said pulse generator.

6. The combination defined by claim 5 in which the improvement includes an electrical pulse injector means for rendering the control means periodically ineffective to apply voltage from said source to said load, and means operatively connecting said pulse generator to said pulse injector means for simultaneously rendering the pulse injector means effective with the operation of said second means to discharge said capacitor means.

7. In a linear sawtooth output voltage generator of a type including a source of electrical current, means for controlling the flow of electrical current from said source to an electrical load, capacitor means for controlling said current control means, time delay means periodically operable for charging said capacitor means from said source so as to apply a bias in one sense to said current control means to effect a linearly rising electrical current flow therethrough from the source to the load with an increase in the electrical charge applied to said capacitor means, and means periodically operable in an alternate sense for discharging said capacitor means so as to effect a sharp decrease in the bias applied in said one sense to said control means to thereby effectively decrease the current flow through said control means to said load; the improvement in which said discharge means includes means to limit the discharge of said capacitor means so that the charge of said capacitor means may be thereupon retained at a predetermined minimum voltage level, an electrical pulse injector means to bias said control means in another sense in opposition to the retained charge of said capacitor means to completely cut off the passage of current through the control means from the source to said load, transfer means operable in one sense to simultaneously effect operation of said discharge means and said pulse injector means, and said transfer means being operable in another sense to alternately render ineffective both said discharging means and said pulse injector means while simultaneously initiating operation of said charging means for the capacitor means so as to thereupon render the retained charge of said capacitor means effective to bias the control means in said one sense so as to effect a jump in the output voltage applied through said control means followed by a linear increase in a sawtooth output voltage wave being applied therethrough with increase in the charge applied to the capacitor means by said time delay charging means, and a pulse generator means to operate said transfer means so as to effect a predetermined interval of time between a cessation of the sawtooth output voltage wave and a start of the application of a succeeding sawtooth output voltage wave through the control means to the output load.

8. The combination defined by claim 7 in which said means to limit the discharge of said capacitor means includes a zener diode having a reverse current breakdown voltage characteristic such as to permit the discharge of the capacitor means by a reverse flow of current from the capacitor means and through said zener diode until the charge of said capacitor means has been reduced to the predetermined minimum voltage level.

9. In a control circuit of a type including an electric current control device having electrodes between which an electric current flow may be effected, and a current flow control element, a capacitor means to supply a variable bias to said current flow control element, a time delay charging circuit for said capacitor means to so bias said current flow control element as to effect a linearly rising electric current flow between the electrodes of said control device during the time delay of said charging circuit, control means operable in one sense to effect a discharging circuit for said capacitor to terminate the bias applied to said current flow control element by said capacitor means, and said control means being operable in another sense to render said discharging circuit ineffective and initiate operation of said time delay charging circuit; the improvement in which said discharging circuit includes a zener diode having a reverse current breakdown voltage level of a predetermined value, said predetermined value being greater than a voltage drop across the flow control element and said electrodes and less than a maximum charged voltage of said capacitor means, said control means being operable in said one sense to cause a reverse current discharge through said zener diode from said capacitor means to reduce the maximum charged voltage of said capacitor means to a minimum charged voltage equal to said predetermined value, and said control means being thereafter operable in said other sense to cause said minimum charged voltage of said capacitor means to be effective to bias said current flow control element so as to cause, in response thereto, a current flow between the electrodes of said control device which increases linearly with the charging of said capacitor means during the time delay of said charging circuit.

10. The combination defined by claim 9 in which said improvement includes a second current flow control device having electrodes between which an electric current flow may be effected, and a current flow control element, inductive coupling means including a secondary winding operatively connecting the current flow control element of the second control device in a biasing circuit including the electrodes of the other control device, said inductive coupling means including a primary winding inductively coupled to said secondary winding, and means for effecting electrical energization of said primary winding simultaneously with operation of said control means in said one sense so as to induce in said secondary winding an electric current pulse acting in opposition to said biasing circuit and in a sense to bias the current flow control element of said second control flow control device so as to terminate the flow of electric current between the electrodes of the second control device, and said energization effecting means causing simultaneously with operation of said control means in said other sense a termination of the electric current pulse induced in said secondary winding so that the biasing circuit including the electrodes of the other control device may be thereupon effective to bias the current flow control element of the second control device so as to control the flow of current between the electrodes of the second control device in response to the flow of current between the electrodes of the other control device.

11. The combination defined by claim 10 in which the control means includes operator-operative means to set the frequency of operation of said control means in said one and other senses.

12. The combination defined by claim 10 in which said time delay charging circuit includes operator-operative means to set the maximum charged voltage of said capacitor means.

13. The combination defined by claim 10 in which the control means includes operator-operative means to set the duration of operation of said control means in said one sense.

14. The combination defined by claim 10 in which the control means includes first operator-operative means to set the frequency of operation of said control means in said one and other senses, second operator-operative means to set the duration of operation of said control means in said one sense.

15. The combination defined by claim 14 in which the time delay charging circuit for the capacitor means includes a third operator-operative means to set the maximum charged voltage of said capacitor means.

16. In a linear sawtooth output voltage generator of a type including a source of electrical current, means for controlling the flow of electrical current from said source to an electrical load, capacitor means for controlling said current control means, time delay means periodically operable for charging said capacitor means from said source so as to apply a bias in one sense to said current control means to effect a linearly rising electrical current flow therethrough from the source to the load with an increase in the electrical charge applied to said capacitor means, and means periodically operable in an alternate sense for discharging said capacitor means so as to effect a sharp decrease in the bias applied in said one sense to said control means to thereby effectively decrease the current flow through said control means to said load; the improvement in which said discharge means includes a zener diode having a reverse current breakdown voltage characteristic such as to permit the discharge of the capacitor means by a reverse flow of current from the capacitor means and through said zener diode until the charge of said capacitor means has been reduced to a predetermined minimum voltage level, a diode serially connected to said zener diode for controlling flow of the reverse discharge current from the zener diode, an electrical control network for applying an electrical back bias from said source to said control diode so as to prevent the flow of discharge current through the zener diode, said electrical control network including first transfer means operable in one sense to release the electrical back bias applied to said control diode so as to permit the flow of electrical discharge current from the capacitor means and through the zener and control diodes, said first transfer means being operable in another sense to prevent the release of the electrical back bias applied to the control diode and thereby prevent the discharge of the capacitor means, an electrical pulse injector means operable to apply an electrical bias to the current control means in opposition to the charge of said capacitor means, a second transfer means being operable in one sense to effect operation of said electrical pulse injector means and in another sense to prevent operation of said pulse injector means, a control device being operable in a first sense to cause simultaneous operation of said first and second transfer means in said one sense to effect the operation of the discharge means and said pulse injector means, said control device being alternately operable in a second sense to cause simultaneous operation of said first and second transfer means in said other sense to render ineffective both said discharge means and said pulse injector means while simultaneously initiating operation of the charging means for the capacitor means so as to thereupon render the retained charge of said capacitor means effective to bias the current control means in said one sense so as to effect a jump in an output voltage applied through said control means followed by a linear increase in a sawtooth output voltage wave being applied therethrough with increase in the charge applied to the capacitor means by said time delay charging means, an electrical pulse generator to apply electrical pulses to said control device to effect the operation thereof in said first sense for the duration of said electrical pulses, first operator-operative means to set the frequency of operation of said pulse generator, second operator-operative means to set the effective duration of the pulses applied to said control device by the pulse generator so as to thereby determine the interval between charging cycles of said capacitor means, and said time delay means including third operator-operative means to set the maximum charge voltage of said capacitor means and thereby set the peak of the sawtooth output voltage wave effected through the control means to the output load.

References Cited
UNITED STATES PATENTS

| | | | |
|---|---|---|---|
| 2,939,040 | 5/1960 | Isabeau | 315—27 |
| 2,998,532 | 8/1961 | Smeltzer | 307—88.5 |
| 3,070,727 | 12/1962 | Birt | 315—27 |
| 3,286,105 | 11/1966 | Attwood | 307—88.5 |

ARTHUR GAUSS, *Primary Examiner.*

J. S. HEYMAN, *Assistant Examiner.*